(12) United States Patent
Maddox et al.

(10) Patent No.: US 9,029,451 B2
(45) Date of Patent: May 12, 2015

(54) WATERBORNE COATING COMPOSITIONS THAT INCLUDE 2,2,4-TRIMETHYL-3-OXOPENTANOATE ESTERS AS REACTIVE COALESCENTS

(75) Inventors: John Thorton Maddox, Jonesborough, TN (US); Mark Dwight Clark, Kingsport, TN (US); Robert Lee Eagan, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 12 days.

(21) Appl. No.: 12/968,816

(22) Filed: Dec. 15, 2010

(65) Prior Publication Data

US 2012/0157614 A1 Jun. 21, 2012

(51) Int. Cl.
*C08K 5/10* (2006.01)
*C09D 7/06* (2006.01)
*C09D 5/02* (2006.01)

(52) U.S. Cl.
CPC . *C09D 7/06* (2013.01); *C09D 5/024* (2013.01)

(58) Field of Classification Search
USPC .................................................. 524/317, 320
See application file for complete search history.

(56) References Cited

U.S. PATENT DOCUMENTS

| | | | |
|---|---|---|---|
| 3,057,914 A * | 10/1962 | Wood et al. ................ 560/249 |
| 3,106,477 A * | 10/1963 | Wright et al. .............. 106/162.7 |
| 3,197,500 A | 7/1965 | Kitchens et al. |
| 3,214,461 A * | 10/1965 | Elam et al. ..................... 525/61 |
| 3,220,865 A * | 11/1965 | Coney ....................... 106/170.32 |
| 3,892,903 A * | 7/1975 | Dowbenko .................... 428/460 |
| 4,215,195 A | 7/1980 | Ponticello et al. |
| 4,839,413 A | 6/1989 | Kiehlbauch et al. |
| 4,855,349 A | 8/1989 | Ingle |
| 4,927,876 A | 5/1990 | Coogan et al. |
| 4,939,233 A | 7/1990 | Jenkins et al. |
| 4,946,932 A | 8/1990 | Jenkins |
| 5,055,506 A | 10/1991 | Knutson |
| 5,073,445 A | 12/1991 | Ingle |
| 5,137,961 A | 8/1992 | Goos et al. |
| 5,155,252 A | 10/1992 | Yamamoto et al. |
| 5,247,040 A | 9/1993 | Amick et al. |
| 5,296,530 A | 3/1994 | Bors et al. |
| 5,349,026 A * | 9/1994 | Emmons et al. ........... 525/328.6 |
| 5,391,624 A | 2/1995 | Rasoul et al. |
| 5,484,849 A | 1/1996 | Bors et al. |
| 5,494,975 A | 2/1996 | Lavoie et al. |
| 5,498,659 A | 3/1996 | Esser |
| 5,519,071 A | 5/1996 | Rheinberger et al. |
| 5,534,310 A | 7/1996 | Rokowski et al. |
| 5,539,073 A * | 7/1996 | Taylor et al. .................... 526/323 |
| 5,721,329 A | 2/1998 | Fujiwa et al. |
| 5,756,826 A | 5/1998 | Hanselmann |
| 5,820,993 A | 10/1998 | Schall et al. |
| 5,872,297 A | 2/1999 | Trumbo |
| 5,886,116 A | 3/1999 | Trumbo |
| 5,889,098 A | 3/1999 | Trumbo |
| 5,932,350 A | 8/1999 | Lauer et al. |
| 5,945,489 A | 8/1999 | Moy et al. |
| 5,962,556 A | 10/1999 | Taylor |
| 5,985,018 A | 11/1999 | Link et al. |
| 5,990,224 A | 11/1999 | Raynolds et al. |
| 5,998,543 A | 12/1999 | Collins et al. |
| 6,005,035 A | 12/1999 | Raynolds et al. |
| 6,025,410 A | 2/2000 | Moy et al. |
| 6,060,556 A | 5/2000 | Collins et al. |
| 6,090,882 A | 7/2000 | Trumbo |
| 6,201,048 B1 | 3/2001 | Raynolds et al. |
| 6,262,169 B1 | 7/2001 | Helmer et al. |
| 6,265,028 B1 | 7/2001 | Zhao et al. |
| 6,417,267 B1 | 7/2002 | Stockl et al. |
| 6,417,269 B1 | 7/2002 | Murray et al. |
| 6,969,734 B1 | 11/2005 | Pressley et al. |
| 7,101,921 B2 | 9/2006 | Edwards et al. |
| 7,138,438 B2 | 11/2006 | Lauer et al. |
| 2003/0134973 A1 | 7/2003 | Chen et al. |
| 2008/0194722 A1 | 8/2008 | Abuelyaman et al. |
| 2010/0081769 A1 | 4/2010 | Ma |

FOREIGN PATENT DOCUMENTS

| | | |
|---|---|---|
| EP | 0 241 127 A2 | 10/1987 |
| EP | 0 492 847 A2 | 7/1992 |
| EP | 0 501 614 A2 | 9/1992 |
| EP | 0 875 496 A1 | 11/1998 |
| EP | 1 070 699 A1 | 1/2001 |
| EP | 1 348 416 A1 | 10/2003 |
| GB | 2 335 424 A | 9/1999 |
| JP | 4041462 A | 2/1992 |
| JP | 4106925 A | 4/1992 |

(Continued)

OTHER PUBLICATIONS

Notification of Transmittal of the International Search Report and the Written Opinion of the International Searching Authority, or the Declaration with a mailing date of Feb. 29, 2012 and International application No. PCT/US2011/063903.
ASTM D2369.
Smith, Oliver W., et al., "New vinyl monomers for emulsion polymers", Progress in Organic Coatings, 22, (1993), pp. 19-25.
Office Action notification date May 6, 2013 received in co-pending U.S. Appl. No. 12/968,849.
Office Action notification date May 6, 2013 received in co-pending U.S. Appl. No. 12/968,780.

(Continued)

*Primary Examiner* — Wenwen Cai

(74) *Attorney, Agent, or Firm* — James K. Leonard; Dennis V. Carmen

(57) ABSTRACT

Waterborne coating compositions are disclosed that include a latex emulsion polymer, and, as a reactive coalescent, a 2,2,4-trimethyl-3-oxopentanoate ester. The coating compositions of the invention have a reduced VOC content, and provide improved coalescing activity.

17 Claims, No Drawings

(56) References Cited

FOREIGN PATENT DOCUMENTS

| | | | |
|---|---|---|---|
| JP | 0527399 A | 10/1993 | |
| JP | 06027750 A | 2/1994 | |
| JP | 06095441 A | 4/1994 | |
| JP | 06130706 A | 5/1994 | |
| JP | 07084379 A | 3/1995 | |
| JP | 08050380 A | 2/1996 | |
| JP | 08194341 A | 7/1996 | |
| JP | 11335222 A | 12/1999 | |
| JP | 3274214 B2 | 4/2002 | |
| JP | 2003 237246 A | 8/2003 | |
| JP | 3505129 B2 | 3/2004 | |
| JP | 2004 125985 A | 4/2004 | |
| JP | 3588014 B2 | 11/2004 | |
| WO | WO 99/58608 A1 | 11/1999 | |
| WO | WO 2005/105963 A1 | 11/2005 | |
| WO | WO 2007/094922 A2 | 8/2007 | |

OTHER PUBLICATIONS

Moszner, Norbert et al., "Reaction behavior of β-ketoesters: 3. Polymerizable reaction products of 2-acetoacetoxyethyl methacrylate with aromatic isocyanates and aldehydes", Polymer Bulletin 33, (1994), 43-49.

Witzman, J. S., et al., "Comparison of Methods for the Preparation of Acetoacetylated Coating Resins", Eastman Kodak Company, Oct. 1990, vol. 62, No. 789 Presented at the 16$^{th}$ Annual Water-Borne and Higher-Solids Coatings Symposium, New Orleans, LA, Feb. 1-3, 1989.

Moszner, Norbert, et al., "Reaction behavior of monomeric β-ketoesters: 2. Synthesis, characterization and polymerization of methacrylate group containing enamines", Polymer Bulletin 32, (1994) pp. 419-426.

Notification of Transmittal of the International Search Report and the Written Opinion of the International Searching Authority, or the Declaration dated Feb. 14, 2012, International application No. PCT/US2011/0162181.

Notification of Transmittal of the International Search Report and the Written Opinion of the International Searching Authority, or the Declaration dated Feb. 9, 2012, International application No. PCT/US2011/062295.

Copending U.S. Appl. No. 12/968,780, filed Dec. 15, 2010, John Thornton Maddox, et al.

Copending U.S. Appl. No. 12/968,849, filed Dec. 15, 2010, John Thornton Maddox, et al.

USPTO Notice of Allowance dated Jun. 6, 2014 for copending U.S. Appl. No. 12/968,780.

USPTO Notice of Allowance dated Jun. 6, 2014 for copending U.S. Appl. No. 12/968,849.

* cited by examiner

WATERBORNE COATING COMPOSITIONS THAT INCLUDE 2,2,4-TRIMETHYL-3-OXOPENTANOATE ESTERS AS REACTIVE COALESCENTS

FIELD OF THE INVENTION

This invention relates to waterborne coating compositions, and in particular, to coating compositions that include latex emulsion polymers and 2,2,4-trimethyl-3-oxopentanoate esters provided as reactive coalescents.

BACKGROUND OF THE INVENTION

Successful waterborne acrylic, or latex emulsion, coating compositions must deliver performance comparable to traditional solvent-borne coatings, while meeting increasingly stringent VOC (volatile organic compounds) emission regulations. Many latex emulsion polymers utilized in latex paints do not coalesce at or near room temperature. The formation of a latex film can be facilitated by incorporating a coalescing agent in the latex emulsion. These coalescing agents, or coalescents, facilitate the individual latex particles coming together to thereby form a continuous film at a given temperature by reducing the minimum film-forming temperature (MFFT) of the latex emulsion polymer.

Traditional coalescents are sometimes described as fugitive coalescents since they tend to escape from the coating film over time. As a result, in some jurisdictions, such coalescents are regulated as VOCs, or volatile organic compounds. A need therefore exists for a non-fugitive coalescent that is capable of meeting the VOC regulations imposed on the paint industry.

To meet VOC regulations, higher molecular weight coalescents may be used to aid in film formation. Unfortunately, these coalescents typically remain in the film and plasticize, that is, reduce the hardness, of the final coating. Further, the coalescents may contribute an unpleasant smell to the paint. Based on these considerations, there is a demonstrated need for less volatile and low-odor coalescing agents that improve coalescence but do not reduce the hardness of the final coating. It would be an additional advantage if the coalescents were reactive, such that they might even increase the hardness of the final coating.

U.S. Pat. No. 3,197,500 discloses methods of making 2,2,4-trimethyl-3-ketopentanoates via the reaction of 2,2,4,4-tetramethyl-1,3-cyclobutanedione with alcohols under basic catalysis. The resulting molecules are said to be valuable for use in perfumery because of their desirable odor and their odor persistence qualities.

U.S. Pat. No. 3,214,461 discloses methods of making 2,2,4,4,-tetraalkyl-3-oxobutyric acid esters said to be useful as plasticizers for cellulose esters and other polymeric plastic substances. The methods are also said to be useful for esterifying and thereby stabilizing proteins. One of the esters, the 2,2,4-trimethyl-3-oxovaleric acid ester of α-methyl-d-glucoside, was found to be compatible with, and to give a good film with, cellulose acetate-butyrate of ½-sec. viscosity, in equal proportions.

There remains a need for less volatile and low-odor coalescing agents that improve the coalescence of latex emulsion films but do not reduce the hardness of the final coating. It would be an additional advantage if the coalescents were reactive, such that they might even increase the hardness of the final coating when cured.

SUMMARY OF THE INVENTION

In one aspect, the invention relates to waterborne coating compositions that include: (a) a latex emulsion polymer; and (b) a 2,2,4-trimethyl-3-oxopentanoate ester corresponding to the following formula 1:

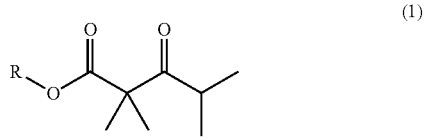

wherein R comprises a residue from any of a number of compounds having hydroxyl functionality.

In another aspect, R comprises a residue from any of the following hydroxyl-functional compounds: a straight or branched chain monohydroxyl compound having from 1-20 carbon atoms, or from 1-12 carbon atoms, or from 1 to 8 carbon atoms; a straight or branched chain alkyl glycol having from 2 to 20 carbon atoms, or from 2-12 carbon atoms, or from 2 to 8 carbon atoms; a straight or branched chain ether alcohol having from 3 to 20 carbon atoms, or from 3-12 carbon atoms, or from 3 to 8 carbon atoms; a straight or branched chain ether glycol having from 3 to 18 carbon atoms, or from 3-12 carbon atoms, or from 3 to 8 carbon atoms; a cyclic alkyl alcohol or glycol having from 5 to 18 carbon atoms, or from 5-12 carbon atoms, or from 5 to 8 carbon atoms; or a cyclic ether alcohol or glycol having from 5 to 18 carbon atoms, or from 5-12 carbon atoms, or from 5 to 8 carbon atoms.

In further aspects, the 2,2,4-trimethyl-3-oxopentanoates comprise 2-hydroxyethyl 2,2,4-trimethyl-3-oxopentanoate, or 3-hydroxy-2,2-dimethylpropyl 2,2,4-trimethyl-3-oxopentanoate, or 3-hydroxy-2,2,4-trimethylpentyl 2,2,4-trimethyl-3-oxopentanoate, or 2,2'-(ethane-1,2-diylbis(oxy))bis(ethane-2,1-diyl)bis(2,2,4-trimethyl-3-oxopentanoate), or 2-(2-butoxyethoxy)ethyl 2,2,4-trimethyl-3-oxopentanoate, or 2-(2-ethylhexyloxy)ethyl 2,2,4-trimethyl-3-oxopentanoate, or (3R,3aR,6S,6aR)-hexahydrofuro[3,2-b]furan-3,6-diyl bis (2,2,4-trimethyl-3-oxopentanoate), each of which is exemplified herein.

In yet another aspect, R may comprise a residue from methanol, ethanol, a propanol, a butanol, or a pentanol; or a residue from ethylene glycol, propylene glycol, trimethylpropylene glycol, or hydroxypivalyl hydroxypivalate; or from a poly(ethylene glycol), a poly(propylene glycol), diethylene glycol, triethylene glycol, dipropylene glycol, or tripropylene glycol; or from a poly(ethylene glycol) or a poly(propylene glycol) having from 4 to 20 carbon atoms; or from 2-(2-butoxyethoxy)ethanol, 2-(2-ethylhexyloxy)-ethanol, cyclohexanol, or isosorbide, all as further described herein.

Other aspects of the invention are as further disclosed and claimed herein.

DETAILED DESCRIPTION OF THE INVENTION

In one aspect, the invention thus relates to waterborne coating compositions that include: (a) a latex emulsion polymer; and (b) a 2,2,4-trimethyl-3-oxopentanoate ester corresponding to formula 1 set out above, in which R comprises a residue from any of a number of compounds having hydroxyl functionality.

In one aspect, R comprises a residue from a hydroxyl-functional compound having from 1 to 20 carbon atoms.

In another aspect, R comprises a residue from a straight or branched chain monohydroxyl compound having from 1 to 18 carbon atoms.

In a further aspect, R comprises a residue from a straight or branched chain alkyl glycol having from 2 to 20 carbon atoms.

In another aspect, R comprises a residue from a straight or branched chain ether alcohol having from 3 to 20 carbon atoms.

In yet another aspect, R comprises a residue from a straight or branched chain ether glycol having from 3 to 18 carbon atoms.

In a further aspect, R comprises a residue from a cyclic alkyl alcohol or glycol having from 5 to 18 carbon atoms.

In yet another aspect, R comprises a residue from or a cyclic ether alcohol or glycol having from 5 to 18 carbon atoms.

Thus, in various aspects, R may comprise a residue from a substituted or unsubstituted straight or branched alkyl alcohol or diol having from 1 to 18 carbon atoms; a substituted or unsubstituted straight or branched ether alcohol or diol having from 3 to 18 carbon atoms; or a cycloalkyl or heterocyclic alkyl alcohol or diol having from 4 to 12 carbon atoms.

In one aspect, R comprises a residue from methanol, or ethanol, or a straight or branched alcohol having from 3 to 18 carbon atoms.

In another aspect, R comprises a residue from ethylene glycol, or diethylene glycol, or triethylene glycol. In yet another aspect, R comprises a residue from a branched or straight chain ether alcohol having from 3 to 18 carbon atoms.

In yet another aspect, R comprises a residue from a cycloalkyl alcohol or glycol, for example cyclohexanol or cyclohexanedimethanol, or a cyclic ether alcohol or glycol, for example isosorbide.

The alcohol R—OH may thus broadly include any of a number of monohydric organic compounds having a single hydroxyl functionality, or a polyhydric organic compound having multiple hydroxyl functionalities, ranging in complexity from simple alcohols to complex structures containing many functional groups in addition to one or more hydroxyl groups. For example, Table 1 below includes the reactive coalescents prepared in the examples, giving both the structure of the alcohol and the name of the 2,2,4-trimethyl-3-oxopentanoate ester obtained.

In one aspect, the invention thus relates to waterborne coating compositions comprising a latex emulsion polymer and a 2,2,4-trimethyl-3-oxopentanoate ester provided as a reactive coalescent agent. These ester based coalescing agents are relatively easy to prepare and to formulate into latex paints. They exhibit similar or better coalescing properties compared with such currently available coalescing aids as 2,2,4-trimethylpentane-1,3-diol monoisobutyrate (Texanol). Additionally, due to their higher boiling point, they are less volatile and less odiferous. Finally, due to their unique structure, these materials are reactive under UV exposure and will crosslink into the film providing improved film properties. Thus, when we say that the coalescents of the invention are reactive coalescents, we mean that a harder film is obtained upon curing than in the absence of the coalescent, or that the coating composition exhibits a higher gel fraction than in the absence of the coalescent, or both improved hardness and increased gel fraction. Without wishing to be bound by any theory, we believe that the reactive coalescents of the invention generate free radicals, and thus crosslink the latex emulsion polymers with which they are mixed during curing, which includes UV curing.

We have found that the 2,2,4-trimethyl-3-oxopentanoate esters disclosed herein have practical utility as coalescing agents for latex paints. Furthermore, under UV irradiation, these materials are reactive and will crosslink to become part of the film providing improved film properties.

Not wishing to be bound by any theory, the increase in hardness observed and described herein for these reactive coalescents thus appears to result from a chemical reaction, so that the coalescents described herein may be described as reactive coalescents. Coalescing agents, or coalescents, facilitate the individual latex particles coming together to thereby form a continuous film at a given temperature by reducing the minimum film-forming temperature (MFFT) of the latex polymer. Thus, as used herein, the substituted 3-oxopentanoate esters of the invention act as coalescents by reducing the minimum film-forming temperatures of the coating compositions in which they are used.

The invention thus relates to 2,2,4-trimethyl-3-oxopentanoate esters and their use as reactive coalescent agents for latex paint. These novel ester based coalescing agents are easy to prepare and formulate into latex paints. They exhibit similar or better coalescing power to currently available coalescing aids such as 2,2,4-trimethylpentane-1,3-diol monoisobutyrate (Texanol). Additionally, due to their higher boiling point, they are less volatile and less odiferous. Finally, due to their unique structure, these materials are reactive under UV exposure and will crosslink into the film providing improved film properties.

The 2,2,4-trimethyl-3-oxopentanoate esters useful according to the invention as reactive coalescents may be prepared by reacting 2,2,4,4-tetramethyl-1,3-cyclobutanedione with an alcohol, ROH, in the presence of alkaline materials, to yield the desired keto esters. The reaction may thus be represented as shown:

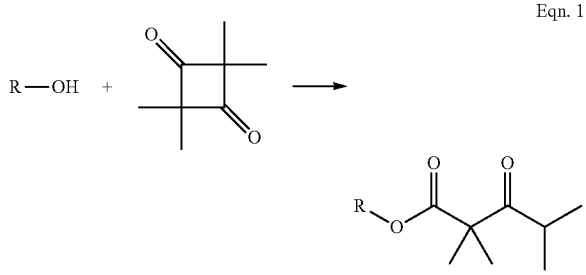

Eqn. 1

The alcohol R—OH may broadly include any of a number of monohydric organic compounds having a single hydroxyl functionality, or a polyhydric organic compounds having multiple hydroxyl functionalities, ranging in complexity from simple alcohols to complex structures containing many functional groups in addition to one or more hydroxyl groups. For example, Table 1 includes the reactive coalescents prepared in the examples, giving both the structure of the alcohol and the name of the 2,2,4-trimethyl-3-oxopentanoate ester obtained.

TABLE 1

Novel Coalescents

| Example | R—OH | Product Name |
|---|---|---|
| 1 | HOCH₂CH₂OH | 2-hydroxyethyl 2,2,4-trimethyl-3-oxopentanoate |
| 2 | 2,2-dimethyl-1,3-propanediol | 3-hydroxy-2,2-dimethylpropyl 2,2,4-trimethyl-3-oxopentanoate |
| 3 | 2,2,4-trimethyl-1,3-pentanediol | 3-hydroxy-2,2,4-trimethylpentyl 2,2,4-trimethyl-3-oxopentanoate |
| 4 | HO-CH₂CH₂-O-CH₂CH₂-O-CH₂CH₂-OH | 2, 2'-(ethane-1,2-diylbis(oxy))bis(ethane-2,1-diyl) bis(2,2,4-trimethyl-3-oxopentanoate) |
| 5 | HO-CH₂CH₂-O-CH₂CH₂-O-C₄H₉ | 2-(2-butoxyethoxy)ethyl 2,2,4-trimethyl-3-oxopentanoate |
| 6 | HO-CH₂CH₂-O-CH₂-CH(C₂H₅)-C₄H₉ | 2-(2-ethylhexyloxy)ethyl 2,2,4-trimethyl-3-oxopentanoate |
| 7 | isosorbide | (3R,3aR,6S,6aR)-hexahydrofuro[3,2-b]furan-3,6-diyl bis (2,2,4-trimethyl-3-oxopentanoate) |

In one embodiment of the present invention, there is thus provided a waterborne coating composition comprising (a) a latex emulsion polymer and (b) a 2,2,4-trimethyl-3-oxopentanoate ester provided as a reactive coalescent.

Examples of the latex emulsion polymers useful according to the invention, also described herein as component (a), include aqueous vinyl polymers, which are the reaction products of one or more ethylenically unsaturated monomers. Examples of the ethylenically unsaturated monomers include, but are not limited to, styrene, methyl acrylate, methyl methacrylate, ethyl acrylate, ethyl methacrylate, butyl acrylate, butyl methacrylate, isobutyl acrylate, isobutyl methacrylate, ethylhexyl acrylate, 2-ethylhexyl methacrylate, 2-ethylhexyl acrylate, isoprene, octyl acrylate, octyl methacrylate, iso-octyl acrylate, iso-octyl methacrylate, acrylic acid, methacrylic acid, itaconic acid, crotonic acid, α-methyl styrene, vinyl naphthalene, vinyl toluene, chloromethyl styrene, hydroxyethyl (meth)acrylate, hydroxypropyl (meth) acrylate, acrylonitrile, glycidyl methacrylate, acetoacetoxy ethyl methacrylate, acetoacetoxy ethyl acrylate, vinyl chloride, vinylidene chloride, vinyl acetate, butyl acrylamide, ethyl acrylamide, and the like.

Latex emulsion polymers are well known in the art of coating compositions, and we do not intend the term to be especially limiting, although some latex emulsion polymers may be better suited as coating compositions, either inherently or in combination with the coalescents of the invention. Examples of commercial latex emulsion polymers useful according to the invention include Rhoplex SG-30, Rhoplex HG-74P, Rhoplex SG-10M, Rhoplex AC2508, Ucar 626, and Ucar 379G (all available from The Dow Chemical Company), Acronal 296D (BASF Corp.), Aquamac 705 and Aquamac 588 (Hexion Specialty Chemicals), and the like.

The coalescents of the invention, that is, component (b), are 2,2,4-trimethyl-3-oxopentanoate esters that may be prepared by the reaction of 2,2,4,4-tetramethyl-1,3-cyclobutanedione with any of a number of alcohols, ROH, in the presence of alkaline materials to yield the desired keto esters.

Alcohols useful according to the invention thus include: methanol, ethanol, propanol, and the like, up to and including any of a number of straight or branched chain monohydroxyl compounds having from 1-18 carbon atoms; diols, or glycols, including ethylene glycol, propylene glycol, trimethylpropylene glycol, hydroxypivalyl hydroxypivalate, and the like, including any of a number of straight or branched chain alkyl glycols having from 2 to 20 carbon atoms; ether alcohols and glycols including poly(ethylene glycols) and poly(propylene glycols) such as diethylene glycol, triethylene glycol, dipropylene glycol, tripropylene glycol and higher poly(ethylene glycols) and higher poly(propylene glycols) having from 8 to 20 carbon atoms; straight or branched chain ether alcohols having from 3 to 18 carbon atoms, including, for example, 2-(2-butoxyethoxy)ethanol and 2-(2-ethylhexyloxy)ethanol, and the like; and cycloalkyl alcohols or glycols, for example cyclohexanol, or a cyclic ether alcohol or glycol, for example, isosorbide. Other such compounds having one or more hydroxyl functionalities and thus useful according to the invention will be apparent to those skilled in the art in light of the present disclosure.

2,2,4-trimethyl-3-oxopentanoate esters useful as reactive coalescents according to the invention include those having a weight percent volatile content of less than 50%, as measured according to ASTM Method D2369. This test may be conducted generally by heating the sample in a forced air oven at 110° C. for 60 minutes. The weight loss after the test is deemed to result from a loss of volatiles originally present in the sample; the percent volatile present in the original sample may then be calculated. Although the cited test can be conducted on coating compositions containing other components such as latex polymers, the values cited herein may be obtained from a sample of the coalescent itself. Thus, the weight percent volatile of a coalescent may be used herein as a yardstick to measure the amount of VOC the coalescent would contribute to the VOC of a coating composition.

In another aspect, the invention thus provides waterborne coating compositions comprising (a) a latex emulsion polymer and (b) a 2,2,4-trimethyl-3-oxopentanoate ester, wherein the 2,2,4-trimethyl-3-oxopentanoate ester provides a volatile content, for example, of less than 50% by weight. Examples of such monohydric alcohols in (b) thus include 1-dodecanol, 1-tetradecanol, 1-hexadecanol, 2-hexyl-1-decanol (e.g. Jarcol 1-16 available from Jarchem Industries Inc.), 2-butyl octanol (e.g. Jarcol 1-12), CO-1214 (available from P&G Chemicals), mixtures thereof, and the like.

Further, certain of the 2,2,4-trimethyl-3-oxopentanoate esters useful according to the invention may be effective in reducing MFFT as well as having a volatile content less than 10% as determined by ASTM Method D2369. Thus, in another embodiment, the invention provides a waterborne coating composition comprising (a) a latex emulsion polymer and (b) a 2,2,4-trimethyl-3-oxopentanoate ester as the coalescent, wherein the 2,2,4-trimethyl-3-oxopentanoate ester provides a volatile content of less than 10% by weight as determined by ASTM Method D2369.

The efficiency of a coalescent can be determined by determining the amount of the coalescent required to reduce the MFFT of a latex polymer to 40° F. (4.4° C.), which is the lowest desirable application temperature of a paint. It is generally considered unacceptable if the amount of the coalescent present in a paint formulation exceeds 20% by weight based on the solids of the latex polymer. This is particularly important for a non-volatile coalescent since the coalescent will remain in the dried film and thus cause a detrimental effect on the coating properties such as, for example, hardness, scrub resistance, and block resistance. As shown in the examples, the level of coalescent required to lower the MFFT of a variety of latex resins is less than 10% exemplifying the coalescent efficiency of these materials.

Thus, in another embodiment, the invention provides a waterborne coating composition comprising from about 1 to about 20 percent by weight, based on the solids of the latex polymer in the composition, of a 2,2,4-trimethyl-3-oxopentanoate ester as the coalescent, as already described. In some instances, a preferred ratio of from 1 to 15 percent may be desired, or alternatively, from 1 to 10 percent.

The 2,2,4-trimethyl-3-oxopentanoate esters of the invention may be blended with other coalescents for ease of handling, storage, and application. For example, a solid 2,2,4-trimethyl-3-oxopentanoate ester may be blended with a liquid coalescent such as Optifilm Enhancer 400 (available from Eastman Chemical Co.) at various ratios to yield a coalescent in liquid form.

The waterborne coating compositions of the invention may further comprise other components commonly used in paint formulations, such as, for example, pigments, filler, rheology modifiers, thickeners, wetting and dispersing agents, deformers, freeze-thaw additives, colorants, open-time additives, driers, catalysts, crosslinkers, biocides, light stabilizers, and the like.

It may be particularly advantageous to add driers to the coating compositions if the 2,2,4-trimethyl-3-oxopentanoate esters of the present invention are based on an unsaturated fatty alcohol such as oleyl alcohol, linoleyl alcohol, geraniol, or citronellol. The added driers are capable of promoting oxidative crosslinking of the unsaturated moieties and thus providing enhanced coating properties. Examples of commercial driers include Zirconium HEX-CEM, Cobalt TEN-CEM, Calcium CEM-ALL, Zirconium HYDRO-CEM, and Cobalt HYDRO-CURE II sold by OMG Americas of Westlake, Ohio.

In other aspects, the latex emulsion polymers useful according to the invention may be a homopolymer, or a copolymer of an ethylenically unsaturated monomer and one or more additional copolymerizable monomers.

The latex emulsion polymers useful according to the invention are addition polymers that may be formed via a free-radical addition polymerization. In such addition polymers, the propagating species may be a free radical, and the polymer is formed in a chain-growth fashion polymerization as understood in the art. As noted, these polymers are latex emulsion polymers in which a monomer solution may be emulsified in an aqueous solution, and under agitation reacted via a free-radical polymerization process as described herein, to form latex particles.

Thus, the water-based latexes useful according to the invention may generally be prepared by polymerizing acrylic (ethylenically unsaturated) monomers. Before conducting polymerization, these ethylenically unsaturated monomers are either pre-emulsified in water/surfactant mixture or used as such.

The polymerization process of making these 'acrylic' latexes may also require an initiator (oxidant), a reducing agent, or a catalyst. Suitable initiators include conventional initiators such as ammonium persulfate, sodium persulfate, hydrogen peroxide, t-butyl hydroperoxide, ammonium or alkali sulfate, di-benzoyl peroxide, lauryl peroxide, di-tertiarybutylperoxide, 2,2-azobisisobutyronitrile, benzoyl peroxide, and the like.

Suitable reducing agents are those which increase the rate of polymerization and include, for example, sodium bisulfite, sodium hydrosulfite, sodium formaldehyde sulfoxylate, ascorbic acid, isoascorbic acid, and mixtures thereof.

Suitable catalysts are those compounds which promote decomposition of the polymerization initiator under the polymerization reaction conditions thereby increasing the rate of polymerization. Suitable catalysts include transition metal compounds and driers. Examples of such catalysts include, but are not limited to, AQUACATÔ, ferrous sulfate heptahydrate, ferrous chloride, cupric sulfate, cupric chloride, cobalt acetate, cobaltous sulfate, and mixtures thereof.

The latex emulsion polymers of the invention are thus prepared from monomers characterized as being ethylenically unsaturated monomers that can participate in addition polymerization reactions. As used herein, ethylenically unsaturated monomers may also be described as vinyl monomers. The polymers made from such monomers are thus addition polymers, and may be formed as emulsion polymers, also known as latexes or latex emulsions.

The latex emulsion polymers useful according to the invention may have pendant moieties, meaning that the ethylenically unsaturated monomers used to prepare the latex polymers of the invention have been reacted into an addition polymer, and that a portion of the monomers remains as a pendant moiety. Alternatively, we may say that the polymers according to the invention have residues from the ethylenically unsaturated monomers of the invention, in which case we mean that the monomers have been reacted into an addition polymer via their ethylenic unsaturation, and that a portion of the monomers remains as a residue. Both these descriptions are well-known in the art of addition polymers, and the descriptions are not otherwise intended to be especially limiting.

In one aspect, the invention thus relates to the use of emulsion polymers which are also known as latexes, or as used herein, latex emulsions. In these latexes, the polymers formed may have a particle size ranging, for example, from about 80 nm to about 300 nm, or from 100 nm to 250 nm, or from 125 nm to 200 nm. The $T_g$ of such latexes may range, for example, from about 0° C. to about 80° C., or from 15° C. to 60° C., or from 20° C. to 40° C.

The latex emulsion polymers useful according to the invention may be prepared by an emulsion free-radical polymerization of ethylenically unsaturated monomers. These latex polymers may be homopolymers, or may be copolymers formed from more than one ethylenically unsaturated monomer.

Examples of ethylenically unsaturated monomers include, but are not limited to, acrylic and methacrylic acid esters such as methyl (meth)acrylate, ethyl (meth)acrylate, propyl (meth) acrylate, isopropyl (meth)acrylate, butyl (meth)acrylate, isobutyl (meth)acrylate, hexyl (meth)acrylate, isooctyl (meth)acrylate, isodecyl (meth)acrylate, lauryl (meth)acrylate, stearyl (meth)acrylate, phenoxyethyl (meth)acrylate, methoxyethyl (meth)acrylate, benzyl (meth)acrylate, ethoxyethyl (meth)acrylate, 2-ethylhexyl (meth)acrylate, cyclopentyl (meth)acrylate and isobutyl (meth)acrylate, as well as combinations of these monomers. A combination of these monomers may be used in order to achieve an appropriate Tg or other properties for the latex emulsion polymer.

Such acrylic and methacrylic acid esters having a C1-C20 alcohol moiety are commercially available or can be prepared by known esterification processes. The acrylic and methacrylic acid ester may contain additional functional groups, such as, hydroxyl, amine, halogen, ether, carboxylic acid, amide, nitrile, and alkyl group. Such esters include carbodiimide (meth)acrylate, methyl (meth)acrylate, ethyl (meth) acrylate, butyl (meth)acrylate, isobutyl (meth)acrylate, ethylhexyl (meth)acrylate, octyl (meth)acrylate, isobutyl (meth) acrylate, allyl (meth)acrylate, and glycidyl (meth)acrylate.

Additional suitable polymerizable ethylenically unsaturated monomers include styrenic monomers. Styrenic monomers include styrene, as well as substituted styrenes such as C1-C6 alkyl ring-substituted styrene, C1-C3 alkyl alpha-substituted styrene or a combination of ring and an alpha-alkyl substituted styrene. Such styrenic polymerizable monomers include styrene, p-methyl styrene, o-methyl styrene, p-butyl styrene, alpha-methyl styrene, and combinations thereof.

In addition, vinyl esters may be used as copolymerizable monoethylenically unsaturated monomers, including vinyl esters of vinyl alcohol such as the VEOVA series available from Shell Chemical Company as VEOVA 5, VEOVA 9, VEOVA 10, and VEOVA 11 products. See O. W. Smith, M. J. Collins, P. S. Martin, and D. R. Bassett, Prog. Org. Coatings 22, 19 (1993).

In general, the vinyl monomers may be polymerized by a conventional emulsion free-radical initiated polymerization technique. The polymerization can be initiated by a water-soluble or water-dispersible free-radical initiator, optionally in combination with a reducing agent, at an appropriate temperature, for example from 55 to 90° C. The polymerization of the monomers may be conducted batch wise, semi-batch, or in a continuous mode.

A conventional surfactant or a combination of surfactants may be used such as anionic or non-ionic emulsifier in the suspension or emulsion polymerization to prepare a polymer of the invention. Examples of such surfactants include, but are not limited to, alkali or ammonium alkylsulfate, alkylsulfonic acid, or fatty acid, oxyethylated alkylphenol, or any combination of anionic or non-ionic surfactant. A surfactant monomer may be used such as HITENOL HS-20 (which is a polyoxyethylene alkylphenyl ether ammonium sulfate available from DKS International, Inc., Japan). A list of surfactants is available in the treatise: McCutcheon's Emulsifiers & Detergents, North American Edition and International Edition, MC Publishing Co., Glen Rock, N.J. 1993. The amount of the surfactant used is usually between 0.1 to 6 wt %, based on the total weight of the monomers.

As polymerization initiators, any conventional free-radical initiator may be used such as hydrogen peroxide, t-butylhydroperoxide, ammonium or alkali sulfate, di-benzoyl peroxide, lauryl peroxide, di-tertiarybutylperoxide, 2,2'-azobisisobutyronitrile, benzoyl peroxide, and the like. The amount of the initiator is typically between 0.05 to 6.0 wt %, based on the total weight of the total monomers.

A free-radical initiator may be combined with a reducing agent to form a redox initiating system. Suitable reducing agents are those which increase the rate of polymerization and include, for example, sodium bisulfite, sodium hydrosulfide, sodium, ascorbic acid, isoascorbic acid and mixtures thereof. The redox initiating system can be used at similar levels as the free-radical initiators.

In addition, in combination with the initiators and reducing agents, polymerization catalysts may be used. Polymerization catalysts are those compounds which increase the rate of polymerization by promoting decomposition of the free radical initiator in combination with the reducing agent at the reaction conditions. Suitable catalysts include transition metal compounds such as, for example, ferrous sulfate heptahydrate, ferrous chloride, cupric sulfate, cupric chloride, cobalt acetate, cobaltous sulfate, and mixtures thereof.

In addition, a low level of a chain transfer agent may also be used to prepare a latex polymer useful in accordance with the invention. Suitable chain transfer agents include, but are not limited to, butyl mercaptan, n-octylmercaptan, n-dodecyl mercaptan, butyl or methyl mercaptopropionate, mercaptopropionic acid, 2-ethylhexyl 3-mercaptopropionate, n-butyl 3-mercaptopropionate, isodecylmercaptan, octadecylmercaptan, mercaptoacetic acid, haloalkyl compounds, (such as carbon tetrabromide and bromodichloromethane), and the reactive chain transfer agents described in U.S. Pat. No. 5,247,040, incorporated herein by reference. In particular, mercaptopropionate, allyl mercaptopropionate, allyl mercaptoacetate, crotyl mercaptopropionate and crotyl mercaptoacetate, and mixtures thereof, represent preferred chain transfer agents.

A copolymerizable monomer known to promote wet adhesion may also be incorporated into the polymer. Examples of wet adhesion promoting monomers include, but are not limited to, nitrogen-containing monomers such as t-butylaminoethyl methacrylate, dimethylaminoethyl methacrylate, diethylaminoethyl methacrylate, N,N-dimethylaminopropyl methacrylamide, 2-t-butylaminoethyl methacrylate, N,N-dimethylaminoethyl acrylate and N-(2-methacryloyloxyethyl)ethylene urea.

Water-dispersible and water-soluble polymers may also be employed as surfactants or stabilizers in accordance with the present invention. Examples of such polymeric stabilizers include water-dispersible polyesters as described in U.S. Pat. Nos. 4,946,932 and 4,939,233; water-dispersible polyurethanes as described in U.S. Pat. Nos. 4,927,876 and 5,137, 961; and alkali-soluble acrylic resins as described in U.S. Pat. No. 4,839,413, all of which are incorporated herein by reference. Cellulosics and polyvinyl alcohols may also be used.

Surfactants and stabilizers may be used during the polymerization to control, for example, particle nucleation and growth, particle size and stability or they may be post-added to enhance stability of the latex or to modify other properties of the latex such as surface tension, wettability, and the like.

In one embodiment, at least one ethylenically unsaturated copolymerizable surfactant may be employed, for example those possessing isopropenyl phenyl or allyl groups. Copolymerizable surfactants may be anionic, such as containing a sulfate or sulfonate group, or nonionic surfactants. Other copolymerizable surfactants include those containing polyoxyethylene alkyl phenyl ether moieties. Additional copolymerizable surfactants include sodium alkyl allyl sulfosuccinate.

The latex polymers in accordance with the invention may have a weight average molecular weight (Mw), for example, of from 1,000 to 1,000,000, as determined by gel permeation chromatography (GPC), or from 5,000 to 250,000.

The particle size for the aqueous dispersions in accordance with the invention may be, for example, from about 0.01 to about 25 μm, or from 0.05 to 1 μm, or from 0.075 to 500 μm. Thus, in an emulsion polymerization in accordance with the invention, the particle size of the latex may range, for example, from 0.01 to 5 μm.

The latex particles generally have a spherical shape, and the spherical polymeric particles may have a core portion and a shell portion or a gradient structure. The core/shell polymer particles may also be prepared in a multi-lobe form, a peanut shell, an acorn form, a raspberry form, or any other form. If the particles have a core/shell structure, the core portion may comprise from about 20 to about 80 wt % of the total weight of the particle, and the shell portion may comprise about 80 to about 20 wt % of the total weight of the particle.

The glass transition temperature (Tg) of the latex polymers in accordance with the present invention, in the absence of the coalescents described herein, may be up to about 100° C. In a preferred embodiment of the present invention, where a film forming at ambient temperatures of the particles is desirable, the glass transition temperature of the polymer itself may preferably be under 60° C.

The latex polymers of the invention may comprise enamine functional polymers, with the enamine functionality serving to improve the hydrolytic stability of the acetoacetoxy group. Enamine functional polymers have been described in Polymer Bulletin 32, 419-426 (1994). Additionally, enamine functional polymers are described in European Patent Application No. 0492847 A2; U.S. Pat. No. 5,296,530; and U.S. Pat. No. 5,484,849, all of which are incorporated herein by reference.

EXAMPLES

The following examples are given to illustrate the invention. It should be understood, however, that the invention is not to be limited to the specific conditions or details described in these examples.

Example 1

Preparation of 2-Hydroxyethyl 2,2,4-trimethyl-3-oxopentanoate

To a 2-liter round bottom flask was charged ethylene glycol (800 mL) and 2,2,4,4-tetramethyl-1,3-cyclobutanedione (185.8 g, 1.33 moles). While using good mixing, potassium carbonate (91.4 grams, 0.663 moles) was added. An exothermic reaction resulted and the batch temperature rose to approximately 65° C. The reaction was held for 1 hour between 50-60° C. The batch was then drowned into 1300 mL demineralized water and extracted with 800 mL ethyl acetate. The ethyl acetate layer was washed several times with water and dried with anhydrous sodium sulfate. The ethyl acetate was removed at 75° C. under 5 mmHg vacuum and the resulting crude product distilled through a 0.5×6 inch Penn-State packed column to provide 153 g of distilled product. The vapor boiling point was recorded as 113° C. at a pot temperature of 135° C. at <1 mmHg vacuum. The GC assay of the resulting product was 97.2%.

Example 2

Preparation of 3-Hydroxy-2,2-dimethylpropyl 2,2,4-trimethyl-3-oxopentanoate

To a 1-liter round bottom flask was charged 2,2,4,4-tetramethyl-1,3-cyclobutanedione (140.2 g, 1.0 moles), neopentyl glycol (208.3 g, 2.0 moles), potassium carbonate (138 g, 1.0 moles) and 500 grams methylene chloride. The batch was heated to reflux for 3 hours then cooled and clarified to remove salts. Methylene chloride was removed with a rotary evaporator and 250 grams of toluene added. The organic layer was washed with 6×50 mL of demineralized water and dried with anhydrous sodium sulfate. Toluene was removed at 3 mmHg and 75° C. to provide 244.4 g of product. GC assay of the product was 96.2%.

Example 3

Preparation of 3-Hydroxy-2,2,4-trimethylpentyl 2,2,4-trimethyl-3-oxopentanoate

To a 1-liter round bottom flask was charged 2,2,4,4-tetramethyl-1,3-cyclobutanedione (140.2 g, 1.0 moles), TMPD glycol (146.2 g, 1.0 moles) and potassium carbonate (73 g, 0.53 moles). The mixture was heated to 120° C. and held for 4 hours. Reaction was cooled and 200 mL of toluene added. Organic layer was washed 4 times at 70° C. Toluene removed to provide 275 g of product. GC assay of the product was 95.9% (4.6:1 mixture of two major isomers).

Example 4

Preparation of 2,2'-(Ethane-1,2-diylbis(oxy))bis (ethane-2,1-diyl)bis(2,2,4-trimethyl-3-oxopentanoate To a 500 mL round bottom flask was charged triethylene glycol (67 mL), 2,2,4,4-tetramethyl-1,3-cyclobutanedione (140.18 g, 1.0 moles) and 0.14 g potassium carbonate. Toluene (100 mL) was added to aid stirring and the very exothermic reaction carefully heated to 100° C. Heat was removed and the reaction allowed to exotherm and then cool to room temperature. Reaction was diluted with ethyl acetate and washed with water. Organic layer dried and removed with rotary evaporator. Crude product purified with a falling film evaporator to provide 122 grams of product (GC Assay 93.9% diester, 3.4% monoester).

Example 5

Preparation of 2-(2-Butoxyethoxy)ethyl 2,2,4-trimethyl-3-oxopentanoate

To a 2-liter, 4-neck round bottom flask was charged 2-(2-butoxyethoxy)-ethanol (121.5 g, 0.7491 mole) and THF (200 mL). With good stirring, the contents of the flask were cooled in an ice batch and sodium hydride dispersion (60% in mineral oil, 0.40 g, 0.010 mole) was charged in one portion resulting in the immediate evolution of hydrogen gas. A previously prepared solution of 2,2,4,4-tetramethyl-1,3-cyclobutanedione (105.0 g, 0.7492 mole) in THF (410 g) was charged to a 1-liter addition funnel attached to the reaction flask. The contents of the addition funnel (~570 mL) were charged to the reaction flask over 23 minutes. The addition was exothermic which resulted in an increase of the batch temperature to 19° C. Analysis of a sample removed from the reaction flask by IR indicated the reaction was complete. Acetic acid (0.64 g, 0.010 mole) was charged to the reaction flask to neutralize the reaction mixture. The THF solvent was distilled under vacuum (1 mmHg) to a pot temperature of 69° C. The resulting crude product (227.6 grams) was transferred to a 1-liter separatory funnel containing methylene chloride (250 mL). The organic solution was washed with water (2×150 ml) and washed with a saturated sodium chloride solution (150 mL) before drying over anhydrous magnesium sulfate. The mixture was filtered and the solvent was removed on a rotary evaporator at a bath temperature of 68° C. and a pressure of <1 mmHg. This afforded 222.5 grams (98.1% of theory) of a clear colorless liquid with a GC assay of 94.4%. The product was distilled under vacuum using a 0.5×12 inch Vigeraux column. Distillation cuts collected at a vapor temperature of 132-135° C. and a pressure of about 1 mmHg were combined to yield the purified product as a clear colorless liquid. The GC assay of the distilled product was 99.6% with a total recovery of 94%.

Example 6

Preparation of 2-(2-Ethylhexyloxy)ethyl 2,2,4-trimethyl-3-oxopentanoate

To a 2-liter, 4-neck round bottom flask was charged 2-(2-ethylhexyloxy)-ethanol (132.7 g, 0.7614 mole) and THF (200 mL). With good stirring, the contents of the flask were cooled in an ice batch and sodium hydride dispersion (60% in mineral oil, 0.42 g, 0.010 mole) was charged in one portion resulting in the immediate evolution of hydrogen gas. A previously prepared solution of 2,2,4,4-tetramethyl-1,3-cyclobutanedione (106.7 g, 0.7612 mole) in THF (410 g) was charged to a 1-liter addition funnel attached to the reaction flask. The contents of the addition funnel (~570 mL) were charged to the reaction flask over 40 minutes. The addition was exothermic which resulted in an increase of the batch temperature to 15° C. Analysis of a sample removed from the reaction flask by IR indicated the reaction was complete. Acetic acid (0.67 g, 0.011 mole) was charged to the reaction flask to neutralize the reaction mixture. The THF solvent was distilled under vacuum (1 mmHg) to a pot temperature of 86° C. The resulting crude product (239.6 grams) was transferred to a 1-liter separatory funnel containing methylene chloride (250 mL). The organic solution was washed with water (2×150 ml) and washed with a saturated sodium chloride solution (150 mL) before drying over anhydrous magnesium sulfate. The mixture was filtered and the solvent was removed on a rotary evaporator at a bath temperature of 78° C. and a pressure of 3 mmHg. This afforded 234.9 grams (98.1% of theory) of a clear, pale yellow liquid with a GC assay of 95.0%. The product was distilled under vacuum using a 0.5×12 inch Vigeraux column. Distillation cuts collected at a vapor temperature of 130° C. and a pressure of <1 mmHg were combined to yield the purified product as a clear colorless liquid. The GC assay of the distilled product was 99.6%.

Example 7

Preparation of (3R,3aR,6S,6aR)-hexahydrofuro[3,2-b]furan-3,6-diyl bis (2,2,4-trimethyl-3-oxopentanoate)

To a 2-liter, 4-neck round bottom flask was charged isosorbide (65.9 g, 0.451 mole) and THF (200 mL). With good stirring, the contents of the flask were heated in a warm water bath to accelerate dissolution of the isosorbide. To the resulting solution was charged sodium hydride dispersion (60% in mineral oil, 0.51 g, 0.013 mole) in one portion resulting in the immediate evolution of hydrogen gas. The contents of the flask were then cooled to about 20° C. A previously prepared solution of 2,2,4,4-tetramethyl-1,3-cyclobutanedione (126.3 g, 0.901 mole) in THF (496 g) was charged to a 1-liter addition funnel attached to the reaction flask. The contents of the addition funnel (~690 mL) were charged to the reaction flask over 27 minutes. No exotherm was observed during the addition indicating no reaction had taken place. Analysis of the reaction mixture by IR confirmed the absence of product. Several additions of sodium hydride dispersion (1.73 g total, 0.0433 mole) and careful heating of the reaction mixture finally yielded an observable exotherm resulting in a vigorous, but controllable refluxing of solvent. After the exotherm subsided, the reaction mixture was cooled to 20° C. Analysis of the reaction mixture by IR indicated the reaction was essentially complete. Acetic acid (3.59 g, 0.0598 mole) was charged to neutralize the reaction mixture. The contents of the reaction flask were heated to distill off the THF solvent. The distillation was continued under reduced pressure and distillate was collected down to a pressure of 1 mmHg at a pot temperature of 53° C. The resulting crude product (195.3 g) was transferred to a 1-liter separatory funnel with methylene chloride (300 mL). The organic solution was washed with water (2×150 mL), washed with a saturated sodium chloride solution (150 mL), and dried over anhydrous magnesium sulfate. The mixture was filtered and the solvent was removed on a rotary evaporator down to a pressure of 1 mmHg at a bath temperature of about 70° C. This afforded 184.4 grams (96.0% of theory) of a clear, golden yellow liquid that slowly crystallized upon standing at ambient temperature. The GC assay of the crude product was 85.4% with about 9.0% of the mono ester present. The crude product (112.0 grams) was dissolved in warm absolute ethanol (225.6 grams) in a 1-L Erlenmeyer flask. The solution was cooled to ambient temperature then place in a lab freezer (~−10° C.) for about 1.5 hours to allow the product to crystallize. The mixture was filtered through a 350-ml sintered glass filtration funnel and the purified product was washed with a cold aqueous ethanol solution (2×100 ml, 2:1 (v:v) EtOH/$H_2O$). The solid was dried to constant weight at ambient temperature under reduced pressure. This afforded 68.75 grams (61.4% recovery) of a white crystalline solid with a GC assay of 98.5%. The product had a melting point (measured by DSC) of 43.6° C.

Example 8

Physical Properties

The novel compounds were evaluated for their coalescing properties and compared to 2,2,4-trimethylpentane-1,3-diol monoisobutyrate (Texanol) and Optifilm Enhancer 400 (OE 400), two coalescents that are widely used in industry (Table 2).

TABLE 2

Physical Properties of Novel Coalescents.

| Compound | Boiling Point (° C. @ 760 torr) | % non-volatile @ 110° C. for 1 hour | Density (lbs/gal)[a] | Water Miscibility | |
|---|---|---|---|---|---|
| | | | | % water in solvent layer | % solvent in water layer |
| Texanol | 255.0 | 0.0 | 7.92 | 3.0 | 0.1 |
| Optifilm Enhancer 400 | 344.0 | 99.3 | 8.06 | 0.9 | 0.0 |
| Example 1 | 254.8 | 10.6 | 8.75 | 7.6 | 5.0 |
| Example 2 | 291.2 | 47.9 | 8.34 | 4.0 | 0.09 |
| Example 3 | 287.7 | 63.8 | 8.13 | 2.1 | 0.07 |
| Example 4 | 320.0 | 99.0 | 8.82 | 0.01 | 0.09 |

TABLE 2-continued

Physical Properties of Novel Coalescents.

| Compound | Boiling Point (° C. @ 760 torr) | % non-volatile @ 110° C. for 1 hour | Density (lbs/gal)[a] | Water Miscibility | |
|---|---|---|---|---|---|
| | | | | % water in solvent layer | % solvent in water layer |
| Example 5 | 272.1 | 64.0 | 8.02 | 0.40 | 0.02 |
| Example 6 | 281.6 | 58.7 | 7.80 | 0.03 | 0.00 |

[a]ASTM D 1475-98.

All the experimental coalescents had boiling points similar or higher than Texanol. Additionally, all the novel materials were less volatile than Texanol. In particular, Example 4 was almost completely nonvolatile. Finally, experimental coalescents 2, 3, 4, 5 and 6 had water miscibility similar to the industry standards. Low water miscibility is an important property for a coalescent.

Water miscibility was measured by the following methods:

% Water in Solvent Method:

Approximately 5-10 mL of the novel coalescent was slowly added to 10-15 mL Milli-Q water in an 8-dram vial. The mixture was slowly stirred for approximately 48 hours at 100-150 rpm. The organic layer was analyzed in triplicate for percent water by Karl Fischer methodology.

% Organic in Water Method:

The novel coalescent was added drop wise to 25 mL Milli-Q water and the mixture stirred at 1000 rpm for 10 minutes. If the coalescent dissolved, an additional drop or drops were added until traces of the organic solvent remained after the mixture had been stirred for 20 minutes. The percent organic solvent at the saturation point was determined gravimetrically.

Example 9

Hydrolytic Stability

Approximately 100 grams of either Rhoplex AC 2508 (Rohm & Haas acrylic polymer emulsion) or Rhoplex SG-10M (Rohm & Haas acrylic polymer emulsion) was weighed out into a 4 ounce jar and 10 phr (parts per hundred resin) of the coalescing aid was added (based on percent solids of the emulsion by weight). The sample was placed on lab rollers for 24 hours before the initial pH and viscosity was taken. The viscosity was measured by a Brookfield viscometer in centipoises. The sample was then placed into a lab oven at 120° F. The pH and viscosity was checked weekly for four weeks (Tables 3 & 4). Any change in the appearance of the sample such as gel particles or phase separation was recorded weekly also.

TABLE 3

Hydrolytic Stability in Rhoplex AC 2508.

| | Texanol | | Optifilm Enhancer 400 | | Example 1 | | Example 2 | | Example 3 | | Example 4 | |
|---|---|---|---|---|---|---|---|---|---|---|---|---|
| Time | pH | Viscosity (cps)[a] | pH | Viscosity (cps)[a] | pH | Viscosity (cps)[a] | pH | Viscosity (cps)[a] | pH | Viscosity (cps)[a] | pH | Viscosity (cps)[a] |
| Initial | 8.2 | 905 | 8.3 | 860 | 8.3 | 1430 | 8.5 | 1510 | 8.5 | 1430 | 8.4 | 1380 |
| 1 week | 7.9 | 685 | 7.8 | 832 | 7.7 | 1360 | 8.4 | 1260 | 8.4 | 1300 | 8.3 | 1200 |
| 2 weeks | 8.0 | 665 | 7.8 | 836 | 7.7 | 1150 | 8.4 | 1230 | 8.4 | 1290 | 8.2 | 1210 |
| 3 weeks | 7.8 | 631 | 7.7 | 832 | 7.6 | 1060 | 8.3 | 1220 | 8.4 | 1250 | 8.3 | 1150 |
| 4 weeks | 7.9 | 638 | 7.7 | 768 | 7.4 | 1070 | 8.3 | 1130 | 8.3 | 1130 | 8.2 | 1100 |

[a]Brookfield viscometer - spindle #3, RPM = 30 @ RT in a 4 oz. jar.

TABLE 4

Hydrolytic Stability in Rhoplex SG-10M.

| | Texanol | | Optifilm Enhancer 400 | | Example 5 | | Example 6 | |
|---|---|---|---|---|---|---|---|---|
| Time | pH | Viscosity (cps)[a] | pH | Viscosity (cps)[a] | pH | Viscosity (cps)[a] | pH | Viscosity (cps)[a] |
| Initial | 8.7 | 544 | 8.6 | 662 | 8.6 | 548 | 8.6 | 474 |
| 1 week | 8.5 | 554 | 8.3 | 514 | 8.3 | 631 | 8.4 | 585 |
| 2 weeks | 8.8 | 484 | 8.9 | 511 | 8.7 | 461 | 8.8 | 484 |
| 3 weeks | 8.6 | 474 | 8.8 | 521 | 8.6 | 458 | 8.8 | 347 |
| 4 weeks | 8.3 | 471 | 8.4 | 501 | 8.2 | 511 | 8.4 | 461 |

[a]Brookfield viscometer - spindle #3, RPM = 30 @ RT in a 4 oz. jar.

The hydrolytic stability of 2, 3, 4, 5 and 6 were better than the industry standards. Hydrolytic stability is an important contributor to the two year shelf life that is required of commercial architectural paints.

Example 10

MFFT Testing

The MFFT samples were prepared by weighing out 20 grams (+/−0.01 g) of emulsion into 50 ml beakers. The beakers of emulsion were placed on magnetic stirrers and the coalescing aid added dropwise by pipet. The weight of the drops were determined by adding 40 drops of the coalescing aid to a tared weighing dish, then the weight per drop was calculated by taking an average of the total weight (total weight divided by 40 drops). The coalescing aid was added to the emulsion based on solids by weight. The MFFT samples were allowed to stir for approximately 15 minutes, transferred to 8 dram vials and placed onto lab rollers and allowed to equilibrate for at least 24 hours. The samples were then drawn down on the MFFT bar, which is typically set on range #2 (0° to 18° C.), and the films allowed to dry. The areas in which the films have stopped cracking are visually determined and the MFFT value is read from the scale on the instrument and converted to degrees Fahrenheit. Linear Regression was used to calculate the amount of coalescing aid required to lower the films MFFT to 40° F. In Table #5, the phr40 values (parts per hundred resin based on solids by weight) are the amount of coalescing aid required to reduce the MFFT to 40° F. A lower number indicates the coalescent is more efficient at reducing the MFFT of the film.

TABLE 5

Coalescing Efficiency of Novel Coalescents.

| Latex | Texanol | Optifilm Enhancer 400 | Example 1 | Example 2 | Example 3 | Example 4 | Example 5 | Example 6 |
|---|---|---|---|---|---|---|---|---|
| | | phr of Coalescent required to lower MFFT to 40° F. | | | | | | |
| Acronal 296D[a] | 4.7 | 4.3 | 4.2 | 5.9 | 6.0 | 5.8 | 4.2 | 5.0 |
| Rhoplex SG-10M[b] | 4.6 | 3.8 | 4.7 | 5.6 | 5.6 | 6.7 | 4.6 | 4.0 |
| Ucar 379G[c] | 0.1 | 1.3 | 1.5 | 1.6 | 1.3 | 1.3 | 0.9 | 1.3 |
| Rhoplex HG-74P[d] | 8.3 | 7.4 | 8.2 | 8.8 | 9.7 | 9.1 | | |
| Ucar 626[e] | 6.2 | 6.1 | 6.5 | 6.4 | 8.2 | 7.0 | | |

[a]Acronal 296D - BASF (styrene-acrylate copolymer dispersion)
[b]Rhoplex SG-10M - Rohm & Haas (acrylic polymer)
[c]Ucar 379G - Dow Chemical (vinyl acrylic)
[d]Rhoplex HG-74P - Rohm & Haas (styrene-acrylic polymer)
[e]Ucar 626 - Dow Chemical (acrylic polymer)

The novel coalescents had good coalescent activity in the latexes tested.

Example 11

Reactive Coalescent Testing

Mixtures of Texanol, Eastman OE-400, experimental coalescents 3, 4, 5 and 7 and two standard latexes were prepared, drawn down on glass plates and exposed to UV irradiation in a light box equipped with 6 UVA-340 light bulbs (Q-Panel Co.) at a height of approximately 5 inches. Samples were analyzed for Konig Hardness and gel fraction over the course of three weeks (Tables 6 and 7).

TABLE 6

Reactive Coalescent Behavior under UV Irradiation.

| | | Latex Mixture (%) | | | | | | | |
|---|---|---|---|---|---|---|---|---|---|
| Rhoplex ML-200[a] | | 100 | 97.3 | 97.3 | 97.3 | | | | |
| Rhoplex SG-10[b] | | | | | | 100 | 96 | 96 | 96 |
| Texanol ester-alcohol | | | 2.7 | | | | 4 | | |
| Eastman OE-400 | | | | 2.7 | | | | 4 | |
| Example 4 | | | | | 2.7 | | | | 4 |
| Week 1 | Konig Hardness (sec): | 19 | 13 | 6 | 13 | 51 | 22 | 10 | 25 |
| | Gel Fraction: | | | | | | | | |
| Week 2 | Konig Hardness (sec): | 16 | 13 | 6 | 14 | 49 | 28 | 9 | 24 |
| | Gel Fraction: | 35 | 32 | 25 | 70 | 46 | 46 | 46 | 71 |
| Week 3 | Konig Hardness (sec): | 20 | 17 | 6 | 20 | 60 | 29 | 10 | 34 |
| | Gel Fraction: | 34 | 38 | 42 | 68 | 49 | 48 | 48 | 75 |

[a]Rhoplex ML-200 - Rohm & Haas (acrylic polymer)
[b]Rhoplex SG-10 - Rohm & Haas (acrylic polymer)

TABLE 7

Reactive Coalescent Behavior under UV Irradiation.

| | | Latex Mixture (%) | | | | | | | |
|---|---|---|---|---|---|---|---|---|---|
| Rhoplex ML-200[a] | | 100 | 97.3 | 97.3 | 97.3 | | | | |
| Rhoplex SG-10[b] | | | | | | 100 | 96 | 96 | 96 |
| Example 3 | | | 2.7 | | | | 4 | | |
| Example 5 | | | | 2.7 | | | | 4 | |
| Example 7 | | | | | 2.7 | | | | 4 |
| Week 1 | Konig Hardness (sec): | 34 | 28 | 28 | 32 | 85 | 49 | 57 | 70 |
| | Gel Fraction: | 26 | 64 | 53 | 42 | 44 | 62 | 66 | 70 |
| Week 2 | Konig Hardness (sec): | 34 | 32 | 35 | 39 | 87 | 63 | 70 | 71 |
| | Gel Fraction: | 39 | 53 | 64 | 76 | 51 | 72 | 79 | 73 |
| Week 3 | Konig Hardness (sec): | 29 | 31 | 33 | 39 | 82 | 62 | 73 | 84 |
| | Gel Fraction: | 50 | 65 | 73 | 82 | 55 | 74 | 82 | 79 |

[a]Rhoplex ML-200 - Rohm & Haas (acrylic polymer)
[b]Rhoplex SG-10 - Rohm & Haas (acrylic polymer)

Latexes containing the experimental example coalescents and exposed to UVA irradiation are harder than those containing Eastman OE-400 and are comparable in hardness to the latex without coalescent. Additionally, the increase in gel fraction suggests that cross linking is occurring.

We claim:
1. A waterborne coating composition comprising:
   (a) a latex emulsion polymer prepared by an emulsion free-radical polymerization of ethylenically unsaturated monomers; and
   (b) a 2,2,4-trimethyl-3-oxopentanoate ester corresponding to the following formula 1:

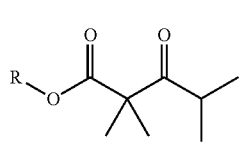

(1)

wherein R comprises a residue from any of the following hydroxyl-functional compounds:
   i) a straight or branched chain monohydroxyl compound having from 1-20 carbon atoms;
   ii) a straight or branched chain alkyl glycol having from 2 to 20 carbon atoms;
   iii) a straight or branched chain ether alcohol having from 3 to 20 carbon atoms;
   iv) a straight or branched chain ether glycol having from 3 to 18 carbon atoms;
   v) a cyclic alkyl alcohol or glycol having from 5 to 18 carbon atoms; or
   vi) a cyclic ether alcohol or glycol having from 5 to 18 carbon atoms;
   wherein the alcohol has one hydroxyl group, and the glycol has two hydroxyl groups.

2. The waterborne coating composition according to claim 1, wherein R comprises a residue from the straight or branched chain alkyl glycol having from 2 to 20 carbon atoms.

3. The waterborne coating composition according to claim 1, wherein R comprises a residue from the straight or branched chain ether alcohol having from 3 to 20 carbon atoms.

4. The waterborne coating composition according to claim 1, wherein R comprises a residue from the straight or branched chain ether glycol having from 3 to 18 carbon atoms.

5. The waterborne coating composition according to claim 1, wherein R comprises a residue from the cyclic alkyl alcohol or glycol having from 5 to 18 carbon atoms.

6. The waterborne coating composition according to claim 1, wherein R comprises a residue from the cyclic ether alcohol or glycol having from 5 to 18 carbon atoms.

7. The waterborne coating composition of claim 1, wherein the 2,2,4-trimethyl-3-oxopentanoate comprises 2-hydroxyethyl 2,2,4-trimethyl-3-oxopentanoate.

8. The waterborne coating composition of claim 1, wherein the 2,2,4-trimethyl-3-oxopentanoate comprises 3-hydroxy-2,2-dimethylpropyl 2,2,4-trimethyl-3-oxopentanoate.

9. The waterborne coating composition of claim 1, wherein the 2,2,4-trimethyl-3-oxopentanoate comprises 3-hydroxy-2,2,4-trimethylpentyl 2,2,4-trimethyl-3-oxopentanoate.

10. The waterborne coating composition of claim 1, wherein the 2,2,4-trimethyl-3-oxopentanoate comprises 2,2'-(ethane-1,2-diylbis(oxy))bis(ethane-2,1-diyl)bis(2,2,4-trimethyl-3-oxopentanoate).

11. The waterborne coating composition of claim 1, wherein the 2,2,4-trimethyl-3-oxopentanoate comprises 2-(2-butoxyethoxy)ethyl 2,2,4-trimethyl-3-oxopentanoate.

12. The waterborne coating composition of claim 1, wherein the 2,2,4-trimethyl-3-oxopentanoate comprises 2-(2-ethylhexyloxy)ethyl 2,2,4-trimethyl-3-oxopentanoate.

13. The waterborne coating composition of claim 1, wherein the 2,2,4-trimethyl-3-oxopentanoate comprises (3R,3aR,6S,6aR)-hexahydrofuro[3,2-b]furan-3,6-diyl bis(2,2,4-trimethyl-3-oxopentanoate).

14. The waterborne coating composition of claim 1, wherein R comprises a residue from methanol, ethanol, propanol, butanol, or pentanol.

15. The waterborne coating composition of claim 1, wherein R comprises a residue from ethylene glycol, propylene glycol, or trimethylpropylene glycol.

16. The waterborne coating composition of claim 1, wherein R comprises a residue from poly(ethylene glycol), poly(propylene glycol), diethylene glycol, triethylene glycol, dipropylene glycol, or tripropylene glycol.

17. The waterborne coating composition of claim 1, wherein R comprises a residue from cyclohexanol, cyclohexanedimethanol, or isosorbide.

* * * * *